Patented July 20, 1954

2,684,361

UNITED STATES PATENT OFFICE 2,684,361

PRODUCTION OF ALKALI SALTS OF PENICILLIN

Jacques L. Wachtel, Lawrenceburg, Ind., Donald R. Croley, Cincinnati, Ohio, and Justin J. Murtaugh, Guilford, Ind., assignors to Schenley Industries, Inc., a corporation of Delaware No Drawing. Application October 23, 1948, Serial No. 56,252

5 Claims. (Cl. 260—239.1)

This invention relates to a new and useful method for the preparation of penicillin, and more particularly to a method for the preparation of the pure alkali salts of penicillin from organic base salts of penicillin.

It is one object of this invention to produce colorless, pure, crystalline alkali salts of penicillin from impure penicillin-containing preparations.

It is a further object of the invention to obtain alkali salts of penicillin having a higher benzyl penicillin (penicillin G) content than the impure penicillin-containing preparations.

Heretofore, penicillin has generally been separated from fermentation broths and aqueous solutions by adsorption onto and elution from activated carbon and/or by solvent extraction processes, using solvents such as chloroform, ether, amyl acetate, butyl acetate and the like, under acid conditions. Solutions of the desired alkali or alkaline-earth salts of penicillin were formed from these solvent solutions by contacting them with aqueous solutions or suspensions of alkali or alkaline-earth hydroxides, carbonates, or bicarbonates; the resulting aqueous phase could be separated and dried to yield solids consisting of non-crystalline penicillin salts and impurities. Usually such dried preparations were yellow or orange in color, and had a potency of 500 to 1000 units per milligram, which usually indicated the presence of 40% to 70% impurities, since pure sodium benzyl penicillin (penicillin G) has a potency of 1667 units per milligram. The desirability of producing penicillin preparations of greater purity and less color has been generally recognized, but processing methods heretofore employed have not been suitable to accomplish this objective. In contrast to the prior art, it has been found that pure, alkali salts of penicillin can be produced in good yield by reacting organic base salts of penicillin with selected alkali salts under certain conditions, as hereinafter described.

In this specification, "penicillin" refers to the organic solvent-soluble, antibiotic substances produced by molds of the *Aspergillus flavus* or *Penicillium notatumchrysogenum* group, without limitation as to the individual chemical structure of such substances. Individual penicillins are referred to in accordance with the designations in the article "Chemistry of Penicillin," Science 102, 627–629 (December 21, 1945), as follows:

Penicillin X=p-hydroxybenzyl penicillin
Penicillin G=benzyl penicillin
Penicillin F=$\Delta^2$-pentenyl penicillin
Penicillin dihydro-F=n-amyl penicillin
Penicillin K=n-heptyl penicillin In this specification, the term "alkali" means any one of the following monovalent metals in group I of the periodic table: lithium, sodium, potassium, cesium, and rubidium. There is included as an alkali, ammonium, which is recognized as being closely related to the alkali metals in many chemical and physical properties. (See Caven and Lander, "Systematic Inorganic Chemistry," 1931, page 103.)

The formation of organic base salts of penicillin is known. Thus, for example, the triethylammonium salt, the N-ethyl piperidine salt, or the cyclohexylamine salt have been formed by reacting ether or amyl acetate solutions of penicillin with triethylamine, N-ethyl piperidine, or cyclohexylamine, respectively. In contrast to most of the non-penicillin substances, these organic base salts of penicillin are sparingly soluble in their reaction mixtures and therefore afford a means for the partial separation of penicillin from most of the impurities present. However, the separation from impurities is not complete, and the organic base salts are usually yellow, due to impurities. Furthermore, these organic base salts have not been considered acceptable forms for the therapeutic administration of penicillin, and heretofore it has not been known to convert, other than by solvent extraction methods, such organic base salts to the alkali salts of penicillin which are acceptable therapeutic forms.

It has been found according to this invention that organic base salts of penicillin can, under certain conditions, be reacted directly with alkali salts of organic acids to yield alkali salts of penicillin of an extraordinary high degree of purity. The process of this invention involves a so-called double decomposition reaction in an organic solvent solution, which reaction may be represented by the following equation:

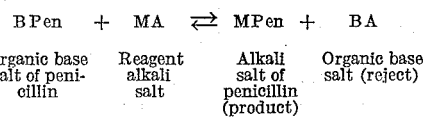

| BPen | + | MA | ⇌ | MPen | + | BA |
|---|---|---|---|---|---|---|
| Organic base salt of penicillin | | Reagent alkali salt | | Alkali salt of penicillin (product) | | Organic base salt (reject) |

The reactants are dissolved in organic solvents which are selected for their ability to dissolve their respective solutes and, upon intermixing in the reaction mass, to form a medium consisting of a single liquid phase in which the desired end-product of the reaction, the alkali salt of penicillin, is substantially insoluble, and in which the other components of the reaction system remain in solution.

Organic base salts of penicillin, such as the triethylammonium salt, the N-ethyl piperidine salt, the cyclohexylamine salt, the N-ethyl-morpholine salt, the N-methylmorpholine salt, the N-ethyl-alpha-pipecoline salt, the N-ethyl-hexahydro 2-6-lutidine salt, the benzylamine salt, or the di-isopropylamine salt may be used as starting materials for the process.

Alkali salts of a wide variety of organic acids, such as formic, acetic, propionic, benzoic, oxalic, malonic, succinic, and salicylic acids, may be used as reagent salts. The invention is not limited to salts of these acids.

The following are examples of suitable solvents for the organic base salts of penicillin in this process: (a) chlorinated organic liquids, such as methylene dichloride, $CH_2Cl_2$; chloroform; sym-tetrachloroethane, also designated as 1,1,2,2-tetrachloroethane, $CHCl_2$—$CHCl_2$; and benzal chloride, $C_6H_5.CHCl_2$; (b) ketones such as acetone, methylethyl ketone, diethylketone, and methyl propyl ketone; and (c) lower monohydroxy aliphatic alcohols having 1–5 carbon atoms, such as methanol; ethanol; 1-propanol, $CH_3CH_2CH_2OH$; isopropanol, $CH_3CHOHCH_3$; n-butanol; sec-butyl alcohol, $CH_3CH_2CHOHCH_3$; and the several amyl alcohols. It has been observed that chlorinated liquids having two substituent chlorine atoms and at least one substituent hydrogen atom on the same carbon atom are especially suited for serving as solvents for the organic base salts of penicillin and as the principal liquid constituent of the reaction mass. This desirable structure is represented by the configuration

where Z represents hydrogen, chlorine, or another carbon atom or organic radical which may or may not contain additional chlorine atoms. This action is believed to be due to hydrogen-bonding between the solvent and the organic base salt of penicillin, but the invention is not limited to this theory and the invention is not limited to such chlorinated liquids.

In the method of this invention, the lower aliphatic alcohols, having 1–8 atoms of carbon, such as methanol, ethanol, n-propanol, isopropanol, n-butanol, isobutyl alcohol, sec-butyl alcohol, pentanol-1, pentanol-2, pentanol-3, 2-methyl-butanol-3, 2,2-dimethyl-propanol-1, 2-methyl-butanol-4, 2-methyl-butanol-1, hexanol-1, 2-ethyl butanol, 2-ethyl hexanol, and ethylene glycol are examples of solvents for the reagent alkali salts of the organic acids. These alcohols may be used without the addition of water, although sometimes it is found desirable or advantageous to add a small quantity of water, as for example up to 10% by volume, in order to increase the solubility of the alkali salt in the alcohol. Also, it has been found that the addition of such a small quantity of water to the alcohol usually helps to retain colored impurities in the mother liquor of the reaction mass, resulting in a whiter precipitated alkali penicillin salt.

The above-named classes of solvents meet the specified requirements for the solvents to be used in the method of this invention.

The reaction above described may be conducted over a wide temperature range, say between −10° C. and +40° C. However, there are practical advantages in working at approximately room temperatures, say from 15° C. to 25° C., because at these temperatures the organic base salt and the reagent alkali salt are soluble to a convenient extent in their respective solvents, yet the product alkali penicillin is not excessively soluble in the reaction mixture.

The precipitation reaction upon which this method is based operates over a wide range of concentrations of organic base salts of penicillin and reagent alkali salts in their respective solvents. Thus the alkali penicillin salt has been successfully prepared from organic base salt solutions of penicillin in acetone, at concentrations as low as 3 grams of organic base salt of penicillin per liter of acetone. On the other hand, the reaction has been successfully conducted, using as much as 400 grams of organic base salt of penicillin per liter of chloroform. It is usually preferred to use a substantially saturated solution of organic base salt of penicillin in the selected solvent, so as to minimize the loss of the desired end-product, due to its solubility in the solvents employed. Concentrations of from 200 to 400 grams of organic base salts of penicillin per liter of chlorinated solvent have been found especially desirable in this method. However, it is noted that the desired alkali salt of penicillin can be precipitated, even though the solutions employed are of much lower concentration that than corresponding to saturation of the organic base salt in the solvent; accordingly, this process is not to be considered as limited to the reaction of saturated solutions.

The reagent alkali salt solution may also be employed over a fairly wide range of concentrations. Usually it is preferred to use a substantially saturated solution of the reagent alkali salt in the selected solvent, so as to keep the reagent volume low and so as to minimize loss of the reaction product due to solubility in the liquids employed. Either anhydrous solvents or solvents containing up to 10% of water, by volume, may be used in this process. Reagent alkali salt solutions of concentrations varying from 10 to 350 grams per liter of solvent have shown the ability to give the desired results in this process. Since some of the alkali salts of organic acids which are used as reagent alkali salts possess rather slight solubility in anhydrous alcohols, it is often, but not always, found advantageous to increase this solubility by adding a small amount of water to the alcohol employed. However, this water addition must be limited because too much water in the reaction mixture will interfere with the precipitation of the alkali salt of penicillin. It is necessary to adjust the water content so as to secure the best over-all results in the process. Thus, for example, when a solution of potassium acetate in n-butanol is used as the reagent alkali salt, it has been found that the solubility of this salt in anhydrous n-butanol is only about 30 grams per liter of solution. However, if about 2.0% by volume of water is added to the n-butanol, the solubility of the potassium acetate is increased to about 104 grams per liter. This amount of water is not sufficient to interfere with subsequent precipitation of the alkali salt of penicillin. If still more water is added to the n-butanol, say as much as 9% by volume, the solubility of potassium acetate in the butanol-water mixture increases to about 315 grams per liter. Although a precipitate of the potassium salt of penicillin is obtained when reactions are conducted with the latter reagent solution, the efficiency is not as great as when reagents of lower water content are employed.

The organic base salt of penicillin used as the starting material for the process need not have any stipulated degree of purity; all preparations which have been tested have been found suitable for the reactions of this method.

Substantially stoichiometric proportions of reactants are used in the described reaction, although sometimes it is preferred to use a moderate excess of one of the reagents, say up to 50% excess, in accordance with usual practice in conducting reactions in organic chemistry.

When the precipitated alkali salt of penicillin has been separated from the reaction mass, it is usually found desirable to wash the crystals of such precipitated salt so as to remove adhering reaction solutions; n-butanol, or the solvent mixture employed in the reaction, or acetone, used in small quantities, are examples of suitable washing liquids. It is usually preferred to wash the crystals first with n-butanol, which removes excess reagent, particularly reagent alkali salt, which might be present; it is then usually preferred to wash with acetone, to remove the n-butanol and to expedite drying of the end product.

In addition to providing a means of obtaining high yields of pure, therapeutically acceptable penicillin salts from impure preparations, the method of this invention results in a preferential precipitation of the alkali salts of benzyl penicillin from the reaction mixture. This is an important advantage because benzyl penicillin is now the commercially desired form of penicillin. The concentration of benzyl penicillin which may be obtained in the alkali penicillin product is a function of the benzyl penicillin content of the organic base salt used as starting material for the process. Thus, by this process, a triethylammonium salt of penicillin consisting of about 50% benzyl penicillin yields alkali salts of penicillin which contain about 80% of benzyl penicillin, whereas organic base salts which contain from 75 to 85% benzyl penicillin yield, by the method of this invention, alkali salts of penicillin containing in excess of 90%–95% benzyl penicillin, as measured by accepted methods of analysis for benzyl penicillin, such as the ultraviolet spectrophotometer method, or the N-ethyl piperidine precipitation method.

Although the method of this invention possesses the important advantage of enriching the benzyl penicillin content of the product alkali penicillin over that of the starting material, this method is not restricted to the production of benzyl penicillin, because as will be obvious from the description of this invention, other penicillins than benzyl penicillin are purified and converted to therapeutically valuable alkali salts by the procedures described herein.

As typical of the manner in which this invention may be practiced, the following examples are given, although these examples are to be considered in no way restrictive:

Example 1

To 8.5 liters of a pale yellow acetone solution containing 11,200 units per milliliter of triethylammonium penicillin (composition approximately 30% benzyl penicillin) was added, with stirring at 20° C., 313 ml. (50% mole excess) of a solution containing 75 gm. per liter of potassium acetate in n-butanol, the water content of which was adjusted to approximately 1.5% by volume. After a few minutes crystals of potassium penicillin separated. After a half hour, when crystallization was complete, the crystals were filtered off by suction, washed with 200 ml. of acetone and dried in vacuo. The dried potassium penicillin weighed 40 grams, which amounted to a 67% recovery of the penicillin in the acetone. The product was white, assayed 1570 units/mg. and contained 56% benzyl penicillin, as determined by the ultraviolet spectrophotometer method.

Example 2

2 gm. of a pale yellow N-ethyl piperidine salt of penicillin, assaying 1400 units/mg. and containing 62% benzyl penicillin as determined by the ultraviolet spectrophotometer method, was dissolved in 6 ml. of sym-tetrachloroethane. To this solution was added at 23° C. a 20% excess (7 ml.) of potassium acetate reagent (75 gm. of potassium acetate per liter of n-butanol containing approximately 1.2% water). Crystals of potassium penicillin separated immediately and were filtered off by suction and washed with n-butanol. The potassium penicillin when dry was white, weighed 1.1 gm., assayed 1630 units/mg. and contained 80% penicillin G. The recovery for this conversion amounted to 66% on a total penicillin basis and 85% on a benzyl penicillin basis.

Example 3

100 gm. of yellow triethylammonium penicillin was dissolved in 500 ml. of chloroform and 225 ml. (one equivalent) of a solution containing 98 gm. of sodium propionate per liter of anhydrous methanol was then added. The mixture was allowed to stand at 5° C. for two hours and the precipitate was filtered off and washed with acetone. The dried sodium penicillin was white in color, weighed 31.2 grams, and assayed 1650 units per milligram. The recovery for this conversion was 38%.

Example 4

100 gm. of yellow triethylammonium penicillin (1350 u./mg. purity), containing 89% of benzyl penicillin as determined by the N-ethyl piperidine method, was dissolved in 250 ml. of U. S. P. chloroform. To this solution was added with stirring 480 ml. of a 50% excess of cold (5° C.) potassium acetate reagent (75 gm. of potassium acetate per liter of n-butanol containing approximately 1.5% water). A precipitate of potassium penicillin formed immediately. The mixture was stirred for 15 minutes. The potassium penicillin was then filtered off by suction, washed with a small volume of n-butanol follow by a small volume of acetone and dried in vacuo. The white salt so produced assayed 1595 units/mg. and weighed 75.3 gm. It contained 96% benzyl penicillin as determined by the N-ethyl piperidine method. This represents a recovery for this conversion of 95% on a benzyl penicillin basis and 88% on a total penicillin basis.

Example 5

5 grams of yellow triethylammonium penicillin (1360 units/mg.) dissolved in 12.5 ml. of U. S. P. chloroform was treated with 3.2 ml. (one equivalent) of a solution containing 286 gm. of ammonium acetate in one liter of isopropanol containing 9% water by volume. The mixture became almost solid and after five minutes the precipitated ammonium penicillin was filtered off and washed with a little 99% isopropanol followed by a little acetone. The dried product was white and weighed 2.2 gm. It had a purity of 1670 units/mg. This amounted to a 54% recovery of total penicillins.

Example 6

7.05 gm. of white triethylammonium penicillin G was dissolved in 25 ml. of U. S. P. chloroform. To this solution was added with stirring 2.6064 gm. of anhydrous rubidium acetate (11.1% excess) in 20 ml. of dry n-butanol. Crystals or rubidium penicillin G precipitated immediately. After fifteen minutes these were filtered off by suction and washed with a little dry butanol followed by a little dry acetone. The dried product was white, weighed 6.72 gm. (92% yield) and had a purity of 1430 units/mg. as determined by the penicillinase titration method.

In general, and as illustrated by the numerous examples, this invention covers a process whereby a solution of an organic base salt of penicillin is reacted with a solution of an alkali salt of an organic acid to produce an alkali salt of penicillin, said alkali salt of penicillin being insoluble in the mixed solvents, the concomitant impurities and the by-product of the reaction being soluble in the mixed solvent. The resultant precipitate of the alkali salt of penicillin is preferably washed with solvents in which the alkali salt of penicillin is substantially insoluble and in which the other components of the reaction mixture are soluble.

Preferred embodiments of this invention have been disclosed, but numerous changes and omissions and additions and variations can be made without departing from its scope.

We claim:

1. Process for the formation of potassium penicillin which comprises metathetically reacting an amine salt of penicillin and potassium acetate in a lower alkanol solution.

2. Process for the formation of an alkali metal salt of penicillin which comprises metathetically reacting an amine salt of penicillin and an alkali metal salt of a lower straight chain alkanoic acid, having at least two carbon atoms, in a lower alkanol solution.

3. Process for the formation of an alkali metal salt of penicillin which comprises metathetically reacting an amine salt of penicillin and an alkali metal salt of a lower straight chain alkanoic acid, having at least two carbon atoms in a polar organic solvent.

4. Process for the formation of potassium penicillin G which comprises metathetically reacting triethylammonium penicillin G and potassium acetate in a lower alkanol solution.

5. Process for the formation of potassium penicillin G which comprises metathetically reacting the triethylammonium salt of penicillin G with potassium acetate in solution of n-butanol.

References Cited in the file of this patent

UNITED STATES PATENTS

| Number | Name | Date |
| --- | --- | --- |
| 2,459,315 | Goldberg et al. | Jan. 18, 1949 |
| 2,463,943 | Behrens | Mar. 8, 1949 |

FOREIGN PATENTS

| Number | Country | Date |
| --- | --- | --- |
| 607,004 | Great Britain | Aug. 24, 1948 |

OTHER REFERENCES

Cuban Patent 22,908, June 30, 1948 (abstracted in "Boletín Oficial del Ministerio de Commercio").

Abraham et al.: "The British Journal of Expt'l Pathology," vol. 23, June 1942, page 113.

British Report CMR-Br-234 (PB-79927) December 5, 1947 (rec'd N. Y., April 18, 1946), page 4.